July 22, 1958  F. G. MRUZEK  2,843,910
CLAMP
Filed Aug. 9, 1954

INVENTOR
FRANK G. MRUZEK
BY J. C. Wiessler
ATTORNEY

United States Patent Office

2,843,910
Patented July 22, 1958

2,843,910

CLAMP

Frank G. Mruzek, Detroit, Mich.

Application August 9, 1954, Serial No. 448,510

20 Claims. (Cl. 24—270)

This invention relates to clamps such, for instance, as are used for attaching hose to internal combustion engines and radiators in the cooling system therefor.

It is an object of this invention to provide a simple and inexpensive clamp or band for gripping a cylindrical surface.

It is another object of the invention to provide a simple and inexpensive clamp construction which is easily applied, which effectively seals the joint, and which is easily adjusted as necessary to provide a tight connection for hose of various diameters.

It is a further object of the invention to provide a novel locking element of inexpensive construction which is manufacturable by a single stamping operation, and which is particularly adapted for use with clamps of the type specified.

With the foregoing objects in view, together with such other objects and advantages as may subsequently appear, my invention consists in the novel construction hereinafter described and claimed, and illustrated in the accompanying drawings wherein:

Figure 1:
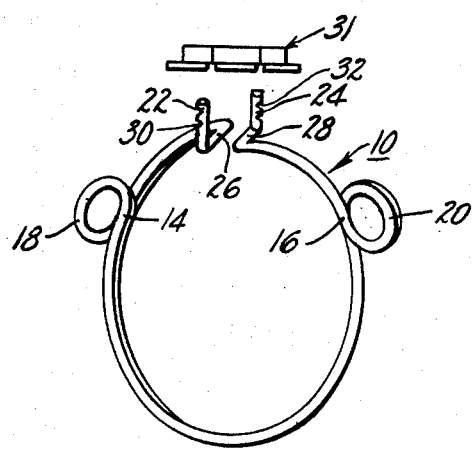
Figure 1 is a perspective view of the clamp ring and locking element in detached or exploded relation.
Figure 2:
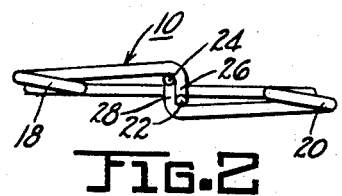
Figure 2 is a plan view of the clamp ring.
Figure 7:
Figure 7 is an enlarged view of the locking portion of the clamp ring.

Referring now to Figures 1, 2, and 7, a single strand clamp or band member 10 may be formed of wire stock, spring steel, sheet metal, or other hard metal, which is half-round in cross section, such as is used for the forming of cotter pins. A suitable length of a selected material, hereinafter referred to as stock, is first bent, preferably with the flat face on the inner side, to form approximately two-thirds of a ring or band between a section 14 and a section 16 of member 10. The resultant converging straight extensions of the stock beyond sections 14 and 16 are then first reversely bent outwardly in opposite directions and on opposite sides of the stock to form coils, or convolutions 18 and 20, respectively, and are then bent inwardly, or toward each other, to complete a basic ring form in the clamp member 10. From the above it is apparent that the opposite end portions of member 10 will not co-exist in the same plane, but that the adjacent edges of the flat face of the stock will be spaced apart at a distance which is substantially equal to the width of said flat face. The end portions of member 10 are then bent in essentially opposite directions toward that side of the stock on which the coils 18 and 20, respectively, are formed and, as illustrated, at approximately right angles to the upper part of the ring. The angle formed between each first bent end portion and the stock may, if desired, be made more or less than a right angle, but such end portions preferably should extend from the stock in essentially opposite directions. The ends 22 and 24 of member 10 are finally bent upwardly to define approximately right angles, as shown, with oppositely bent portions 26 and 28 and to provide means for engaging a locking element 31 in a manner to be described. The upwardly extending ends 22 and 24 are preferably bent such that the resulting length of portions 26 and 28 is equal to not substantially less than the width of the stock nor greater than twice the width of the stock. In the drawings (Figures 1-4 and 7) the length of portions 26 and 28 is shown to be somewhat greater than may be desired in practice, in the interest of clarity. The end portions 22, 26 and 24, 28, as formed, define substantially L-shaped elements, oppositely disposed with respect to each other. Notches 30 and 32 (Figure 7) may be cut in the opposite sides of ends 22 and 24, respectively, for a purpose to be explained.

Figure 3:
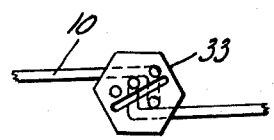
Figure 3 is a plan view of the clamp ring and locking element in locked relation at an intermediate adjustment.
Figure 5:
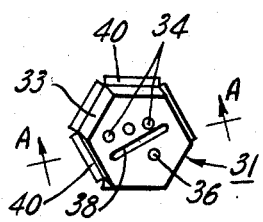
Figure 5 is a perspective view of one form of the locking element.
Figure 4:
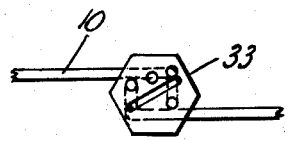
Figure 4 is similar to Figure 3 with the exception that the clamp ring and locking element are shown in maximal adjusted relation.
Figure 6:
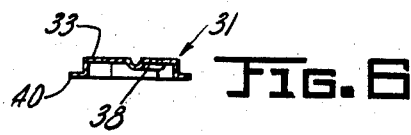
Figure 6 is a section taken along line A—A of Figure 5.

Referring now to Figures 1, 5, and 6, I have provided a novel locking element 31 for use with my clamp. Element 31 may be manufactured from, for example, a square flat piece of draw steel by a single stamping operation. As illustrated, a hexagonal nut form 33 having a plurality of adjustment holes 34, a pilot hole 36, and a screw driver slot 38, is stamped from a flat piece of metal, thereby providing means for receiving either a socket type wrench head, or a screw driver, for turning element 31 when engaged with ends 22 and 24 of clamp member 10. If a proper size of square stock is used in the stamping operation, a plurality of petals 40 will remain attached to the bottom edges of the hex form 33, thereby providing an abutment for the end of a socket wrench head which will insure that proper alignment between the wrench head and the nut form exists during engagement therebetween. The petals 40 further provide stop means such that the wrench head may not slip too far down on the nut form and interfere with locking or unlocking operation of the clamp. Obviously, if desired, petals 40 may be trimmed off the nut form following the stamping operation. Figures 3 and 4 illustrate nut 33 without the petals 40.

In use, for example, as an automotive radiator hose clamp, the clamp member 10 is first placed around the hose in the portion thereof which engages the nipple on the radiator. End 22 of the clamp may then be inserted through pilot hole 36 and element 31 pivoted about said end until the desired adjustment hole 34 is brought into registry with end 24. If desired, element 31 may be permanently connected to end 22 by flanging the top of said end following insertion through pilot hole 36. After engaging element 31 with ends 22 and 24, a socket wrench or pliers, or a screw driver, may be engaged with the nut form or screw driver slot, respectively, and a clockwise twisting motion applied, as viewed from the tool side of element 31, which results in a relative rotating movement of each of the end portions 22, 26 and 24, 28 about the other until the lowermost part of ends 22 and 24 abuts the inner surface of the upper portion of member 10 (see Figures 2, 3 and 4). The locked diameter of the clamp will, of course, depend on the adjustment hole selected in relation to the diameter of the hose and as the distance between pilot hole 36 and the selected adjustment hole 34 is increased, the locked diameter will decrease. Figures 3 and 4 illustrate the locked clamp with intermediate and maximum adjustments, respectively. Obviously, a greater number of adjustment holes than shown, and more than one pilot hole, may be formed in the nut 33 to provide maximum flexibility of adjustment. The spring action of clamp member 10, when locked, applies a considerable twisting moment to element 31 in a locking direction. Notches 30 and 32 have been provided to insure that element 31 will never accidently slip off ends 22 and 24 whether the clamp is in locked or unlocked condition.

The convolutions or coils 18 and 20, as formed, perform a fourfold function; first of all, they provide convenient finger-hold means for adjusting the clamp diameter when the locking element 31 is initially engaged with ends 22 and 24; secondly, they minimize sidewise distortion, during locking and unlocking operations, of that portion of the ring or clamp member which lies below them, by acting as semi-rigid pivots; thirdly, they provide a rigid overall form for the clamp because of the fact that they are formed on opposite sides of the stock, as hereinbefore explained; and lastly, they provide automatic adjustment spring means which adapts the clamp to tightly fit various size hose not provided for by the range of adjustment of the openings in element 31. The latter feature becomes apparent when it is considered that the coils may contract as locking force is applied to the clamp. The range of automatic adjustment of the coils will vary with coil size, the type of metal used in the clamp, and the number of coils formed in the clamp.

If desired, my clamp member 10 may be used without the locking element 31. In such instance, suitable means, such as pliers, may be used to engage ends 22 and 24, and a twisting motion applied to lock the clamp. The clamp member 10 may, if desired, be formed from a corrugated material for increasing the gripping efficiency of the clamp if used with metal pipe, such as with exhaust and tail pipes of automobiles.

Figure 8:
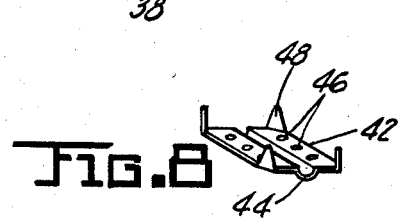
Figure 8 illustrates a modification of the locking element.

Referring now to Figure 8, another form of locking element is illustrated at 42 having a screw driver slot 44, and a plurality of adjustment holes 46, formed therein. Projections 48 are formed at the corners of element 42 and are adapted to be engaged by, for example, a socket type wrench for locking clamp member 10 following engagement of element 42 therewith.

Figure 9:
Figure 9 illustrates a modification of the screw driver slot in the locking element shown in operative relation to a screw driver head.

Figure 9 illustrates a modification of the screw driver slot illustrated in Figure 8. It may be found that the screw driver slot formed as at 44 in element 42 tends to interfere to some extent with locking and unlocking operations of clamp member 10. In order to eliminate this possibility, the slot may be formed as shown at 50 so that no underhang exists in element 42. A screw driver head 52 may be brought into engagement with slot 50 and twisting action applied.

Although only one embodiment of the clamp member, and three embodiments of the locking element have been illustrated and described, it will be apparent to those skilled in the art that many changes in the form of my invention, which embodies an extremely novel concept, may be made without departing from the scope of the appended claims.

I claim:

1. A clamp comprising a band or ring having convolutions formed substantially on the periphery thereof on opposite sides of the material, and end portions which first project outwardly from the band in a substantially horizontal direction towards that side of the material on which said coils are formed and which secondly project upwardly to form clamp locking means.

2. A clamp comprising an open band or ring having first and second bent end portions which project outwardly in essentially opposite directions from the ring in a plane which is substantially transverse to the plane of the ring so as to provide locking means for closing the open ring.

3. A clamp comprising an open ring having a convolute portion affording first adjustment means, said ring terminating in upwardly bent end portions, at least one of which end portions has a bend from the band in first and second respective projections therefrom, and a locking element having at least three openings therein, said openings being selectable in pairs for registry with the upwardly extending ends of said end portions and providing second adjustment means, and said locking element being twistable when registered with said ends to effect a relative rotative movement of said end portions, whereby the locked diameter of said ring may be varied with variations of the pair of openings selected for registry with said ends and with the amount of force applied to said convolute portion.

4. A clamp comprising an open ring having first and second bent end portions which first project outwardly in essentially opposite directions from the ring and then project upwardly in essentially the same direction so as to provide locking means for closing the open ring, and a locking element having at least two openings therein adapted for registry with the upwardly extending ends of said end portions, said locking element being twistable when registered with said upwardly extending ends to effect a relative rotative movement of said end portions.

5. A clamp comprising an open ring terminating in outwardly bent ends, and a locking element having a groove formed in a surface thereof adapted to receive tool means, a pilot opening formed on one side of said groove and a plurality of adjustment openings in predetermined spaced relation formed on the opposite side of said groove, said pilot opening being adapted for registry with one of said ends and being pivotable thereon to register a selected adjustment opening with the other of said ends, and said locking element being twistable when registered with said ends to effect a relative rotative movement thereof.

6. A locking member comprising a nut-shaped element having a plurality of joined sides, said sides being also joined by a surface, said surface having at least two openings formed therein.

7. A locking element adapted for use with clamps comprising a plurality of sides forming a geometric figure, a predominantly flat element joining said sides, said element having a groove formed in the surface thereof adapted for receiving a suitable tool, and at least two openings formed in said element.

8. A locking member used with clamps comprising a predominately flat surface element having a plurality of openings formed therein and portions extending upwardly from the flat element to form a plurality of ears adapted to receive a suitable tool for applying a twisting motion to said element.

9. A locking member for clamps comprising a predominately flat element forming a multi-sided surface having a groove formed therein which is adapted to receive a suitable tool, at least one pilot opening formed in said surface on one side of said groove, and a plurality of adjustment openings formed in said surface on the opposite side of said groove.

10. A clamp comprising a band or ring having a pair of end portions adapted for locking engagement with each other, at least one of which end portions first projects outwardly from the band in a plane which is substantially horizontal whenever the band is vertically disposed and which then projects substantially vertically upwardly in a plane which is substantially parallel to the band.

11. A clamp comprising a band terminating in bent end portions, one of which end portions includes an upwardly extending projection and the other of which end portions includes a first projection extending outwardly from the band and a second projection extending upwardly from the first projection, and a locking element having a pair of openings therein, said openings being registrable with the upwardly extending projections of said end portions, and said locking element being twistable when registered with said projections to effect relative rotative movement of said end portions for locking the clamp.

12. A clamp as claimed in claim 11 wherein notches are formed on sides of the upwardly extending projections to insure against excessive slippage of said locking element when registered with said ends.

13. A clamp comprising an open band or ring which terminates in bent end portions, at least one of which end portions has a bend from the band in first and second directed projections therefrom, and a locking element having at least two openings therein adapted for registry with said end portions, said locking element being twistable when registered with said end portions in a plane which is substantially transverse to the plane of said band to effect a relative rotative movement of said end portions for locking the clamp.

14. A locking element as claimed in claim 6 wherein said nut-shaped element is hollow.

15. A locking element as claimed in claim 6 wherein a plurality of petals are formed on the opposite adjacent edges of said sides.

16. A clamp comprising an open ring terminating in outwardly bent ends, and a nut-shaped locking element having a plurality of sides, a surface joining said sides and at least two openings formed by said surface, said openings being registrable with said bent ends and said nut-shaped locking element being twistable when registered with said bent ends to effect a relative rotative movement thereof for locking the clamp.

17. A clamp comprising a band or ring having first and second bent end portions, one of which end portions includes an upward projection from the ring and the other of which end portions includes first and second projections from the ring, said first projection being directed outwardly from the ring in a plane which is substantially horizontally disposed when the ring is in a vertical position, and said second projection being directed upwardly from the first projection in a plane which is substantially parallel to the plane of the ring.

18. A clamp comprising an open band or ring having first and second bent end portions which first project outwardly from the ring in substantially opposite directions and which secondly project upwardly in substantially the same direction from the first projections to form relatively rotatable locking means for the clamp.

19. A clamp comprising an open ring, said ring terminating in projecting bent end portions, at least one of which end portions has a bend from the band in first and second respective projections therefrom, and a locking element having at least two openings therein, said openings being adapted for registry with the projecting bent end portions and providing clamp adjusting means.

20. A locking member for a lockable clamp comprising a nut-shaped element, and at least two openings defined by said element which are adapted for registry with a portion of said lockable clamp.

References Cited in the file of this patent

UNITED STATES PATENTS

| | | |
|---|---|---|
| 298,962 | Ford | May 20, 1884 |
| 309,525 | Corbin | Dec. 23, 1884 |
| 673,501 | Heagerty | May 7, 1901 |
| 821,692 | Adams | May 29, 1906 |
| 911,583 | Focht | Feb. 9, 1909 |
| 2,069,691 | Wilson et al. | Feb. 2, 1937 |

FOREIGN PATENTS

| | | |
|---|---|---|
| 10,074 | Great Britain | 1902 |
| 16,956 | Germany | Feb. 25, 1882 |
| 108,233 | Switzerland | Jan. 2, 1925 |